US007633605B1

(12) United States Patent
Kallin

(10) Patent No.: US 7,633,605 B1
(45) Date of Patent: Dec. 15, 2009

(54) PRISM SENSOR AND METHOD OF OPERATING A PRISM SENSOR FOR A CHECK PROCESSING MODULE OF A SELF-SERVICE CHECK DEPOSITING TERMINAL

(75) Inventor: Fredrik L. N. Kallin, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 12/220,148

(22) Filed: Jul. 22, 2008

(51) Int. Cl.
*G06K 9/74* (2006.01)

(52) U.S. Cl. ........................................ 356/71; 235/454

(58) Field of Classification Search .................. 356/71; 235/454
See application file for complete search history.

(56) References Cited

U.S. PATENT DOCUMENTS 4,983,854 A 1/1991 Mizuno et al.
4,999,482 A * 3/1991 Yang ..................... 235/462.34
5,084,627 A 1/1992 Ueki et al.
5,262,637 A 11/1993 Cumberledge et al.
5,661,552 A * 8/1997 Nishigai ..................... 356/71
5,758,759 A 6/1998 Negishi
5,764,251 A 6/1998 Hashimoto
5,903,339 A 5/1999 Levasseur
6,101,266 A 8/2000 Laskowski et al.
6,774,986 B2 8/2004 Laskowski
6,794,669 B2 9/2004 Chelvayohan et al.
6,797,974 B2 9/2004 Philipp et al.
6,913,259 B2 7/2005 Phinney et al.
6,960,777 B2 11/2005 Soar
6,970,235 B2 11/2005 Christophersen
6,998,628 B2 2/2006 Chelvayohan
7,130,090 B2 10/2006 Reid

* cited by examiner

*Primary Examiner*—Roy Punnoose
(74) *Attorney, Agent, or Firm*—Michael Chan

(57) ABSTRACT

A prism sensor is provided for detecting presence or absence of a document in a document transport path. The prism sensor comprises a light emitter disposed on a first side of the document transport path and for emitting light across the document transport path to a second side of the document transport path, a reflector including (i) a first reflecting surface for receiving light from the light emitter and for providing first reflected light in response thereto, (ii) a second reflecting surface for receiving the first reflected light from the first reflecting surface and for providing second reflected light in response thereto, and (iii) a third reflecting surface for receiving the second reflected light from the second reflecting surface and for providing third reflected light in response thereto, and a light receiver for receiving the third reflected light from the third reflecting surface and for providing a signal which is indicative of presence or absence of a document in the document transport path.

12 Claims, 10 Drawing Sheets

PRISM SENSOR AND METHOD OF OPERATING A PRISM SENSOR FOR A CHECK PROCESSING MODULE OF A SELF-SERVICE CHECK DEPOSITING TERMINAL

BACKGROUND

The present invention relates to prism sensors, and is particularly directed to a prism sensor and method of operating a prism sensor for a check processing module of a self-service check depositing terminal, such as a check depositing automated teller machine (ATM).

In a typical check depositing ATM, an ATM customer is allowed to deposit a check (without having to place the check in any deposit envelope) in a publicly accessible, unattended environment. To deposit a check, the ATM customer inserts a user identification card through a user card slot at the ATM, enters the amount of the check being deposited, and inserts the check to be deposited through a check slot of a check acceptor. A check transport mechanism receives the inserted check and transports the check in a forward direction along a check transport path to a number of locations within the ATM to process the check.

If the check is not accepted for deposit, the check transport mechanism transports the check in a reverse direction along the check transport path to return the check to the ATM customer via the check slot. If the check is accepted for deposit, the amount of the check is deposited into the ATM customer's account and the check is transported to a storage bin within the ATM. An endorser printer prints an endorsement onto the check as the check is being transported to and stored in the storage bin. Checks in the storage bin within the ATM are periodically picked up and physically transported via courier to a back office facility of a financial institution for further processing.

In some known check depositing ATMs, certain components are housed in modular units which, in turn, are housed in a larger module. The larger module is sometimes referred to as a "check processing module" (CPM). Such modules are included in ATMs provided by NCR Corporation, located in Dayton, Ohio. One example is Model No. CPM2 in which a modular unit called a "pocket module" is located in approximately the central portion of the CPM. Another example is Model No. CPM3 in which the pocket module is located in approximately the bottom portion of the CPM. Still another example is Model No. CPM4 in which the pocket module is located in approximately the top portion of the CPM.

Also, in some known check depositing ATMs, prism sensors are used to detect presence of a check in the check transport path. A typical prism sensor includes a prism-shaped light reflector disposed on one side of the check transport path, and a light emitter and a light receiver which are located on the opposite side of the check transport path. Light from the emitter is directed across the check transport path to the reflector. The light is then reflected off of the reflector and directed back across the check transport path to the receiver.

The prism-shaped light reflector is usually molded from an optically clear acrylic material. The acrylic material needs to be quite thick to account for misalignment tolerances, and to fully enclose the light path. However, as is known, the molding of thick acrylic material is quite difficult to achieve without sink. Any sink on reflective surfaces of the reflector results in drastic reduction of the intensity of reflected light. As such, acrylic prism sensors are quite expensive because of the long cycle times required to manufacture parts which are relatively free of sink. Moreover, since parts of known acrylic prism sensor are glued into place, great care needs to exercised to avoid getting glue on the reflective surfaces of the sensor. Any glue on the reflective surfaces would also drastically reduce the intensity of reflected light. It would be desirable to provide a prism-type of sensor which is relatively low cost, relatively easy to assemble, and relatively easy to disassemble whenever disassembly is required.

SUMMARY

In accordance with an embodiment of the present invention, a prism sensor is provided for detecting presence or absence of a document in a document transport path. The prism sensor comprises a light emitter disposed on a first side of the document transport path and for emitting light across the document transport path to a second side of the document transport path, a reflector including (i) a first reflecting surface for receiving light from the light emitter and for providing first reflected light in response thereto, (ii) a second reflecting surface for receiving the first reflected light from the first reflecting surface and for providing second reflected light in response thereto, and (iii) a third reflecting surface for receiving the second reflected light from the second reflecting surface and for providing third reflected light in response thereto, and a light receiver for receiving the third reflected light from the third reflecting surface and for providing a signal which is indicative of presence or absence of a document in the document transport path.

DETAILED DESCRIPTION

The present invention is directed to an integrated prism sensor for a check processing module of a self-service check depositing terminal, such as a check depositing automated teller machine (ATM) a check processing module for a self-service terminal, such as a check depositing automated teller machine (ATM).

Figure 1:
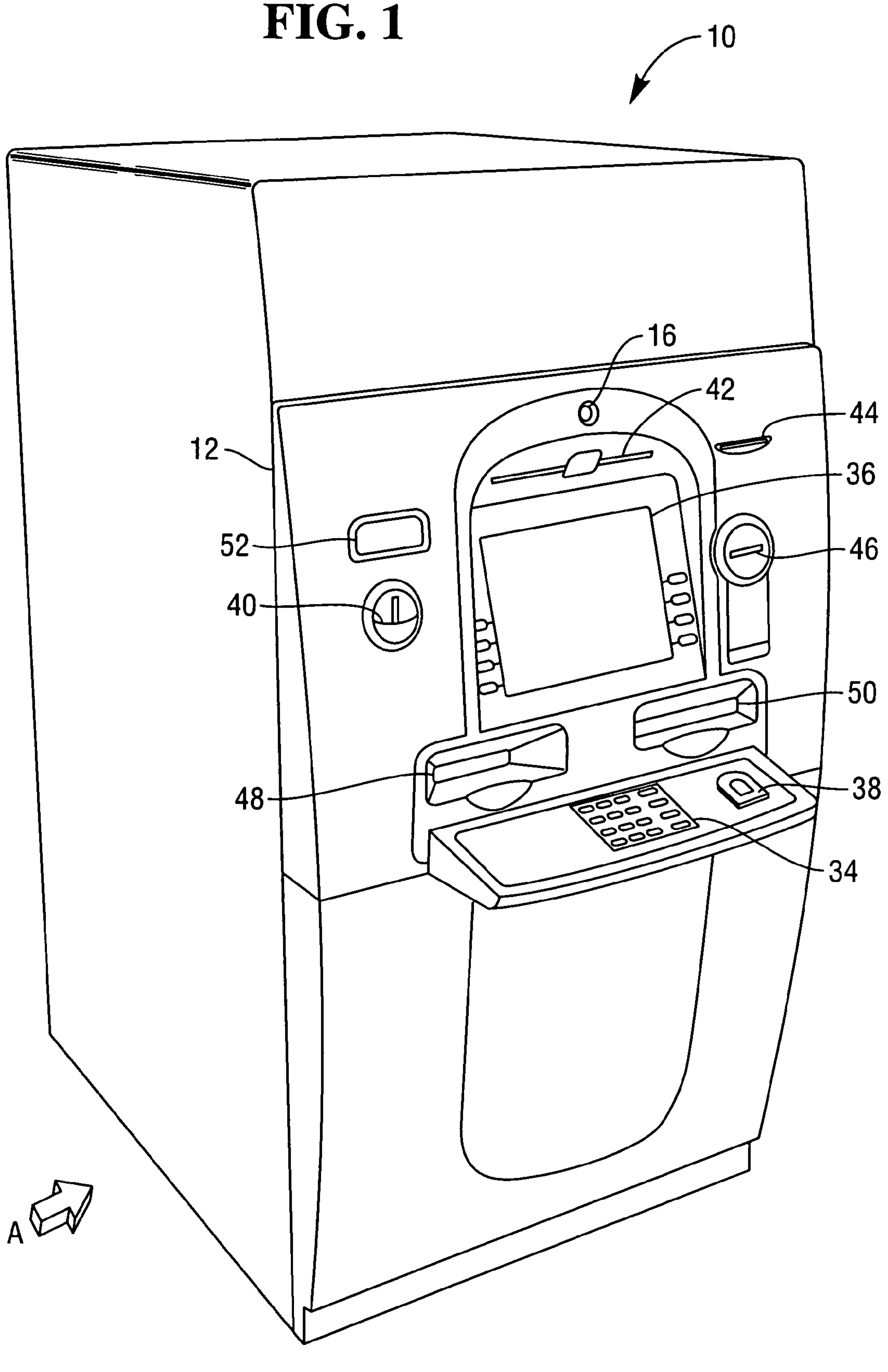
FIG. 1 is a left-front perspective view of one type of check depositing automated teller machine (ATM) embodying the present invention.

Referring to FIG. 1, a self-service check depositing terminal in the form of an image-based check depositing automated teller machine (ATM) 10 is illustrated. The check depositing ATM 10 comprises a fascia 12 coupled to a chassis (not shown). The fascia 12 defines an aperture 16 through which a camera (not shown) images a customer of the ATM 10. The fascia 12 also defines a number of slots for receiving and dispensing media items, and a tray 40 into which coins can be dispensed. The slots include a statement output slot 42, a receipt slot 44, a card reader slot 46, a cash slot 48, another cash slot 50, and a check input/output slot 52. The slots 42 to 52 and tray 40 are arranged such that the slots and tray align with corresponding ATM modules mounted within the chassis of the ATM 10.

The fascia 12 provides a user interface for allowing an ATM customer to execute a transaction. The fascia 12 includes an encrypting keyboard 34 for allowing an ATM customer to enter transaction details. A display 36 is provided for presenting screens to an ATM customer. A fingerprint reader 38 is provided for reading a fingerprint of an ATM customer to identify the ATM customer. The user interface features described above are all provided on an NCR. PERSONAS (trademark) 6676 ATM, available from NCR Financial Solutions Group Limited, Discovery Centre, 3 Fulton Road, Dundee, DD2 4SW, Scotland.

Figure 2:
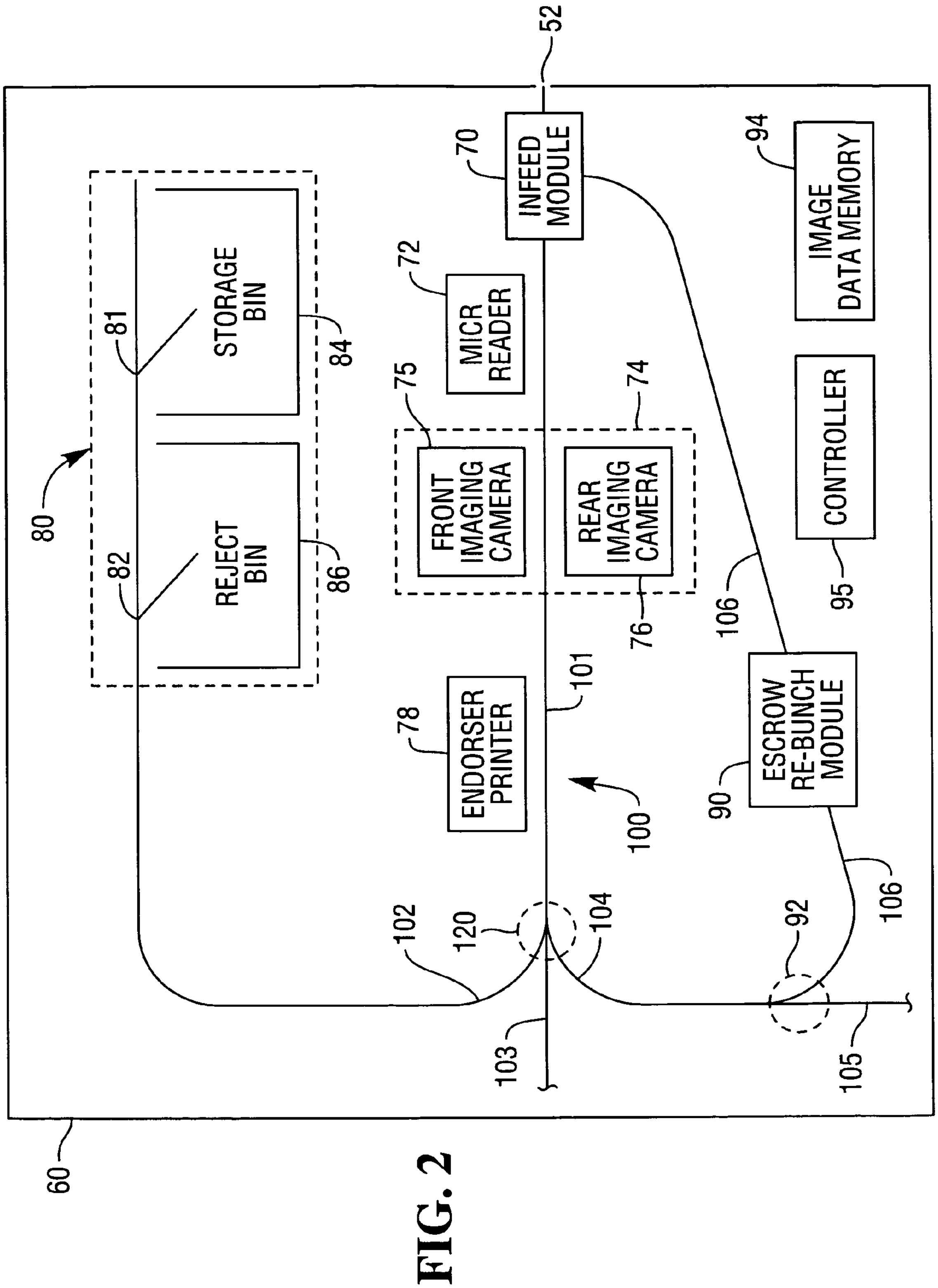
FIG. 2 is a simplified schematic diagram, looking approximately in the direction of arrow A in FIG. 1, and illustrating a check processing module (CPM) configured to operate in the ATM of FIG. 1.
Figure 5:
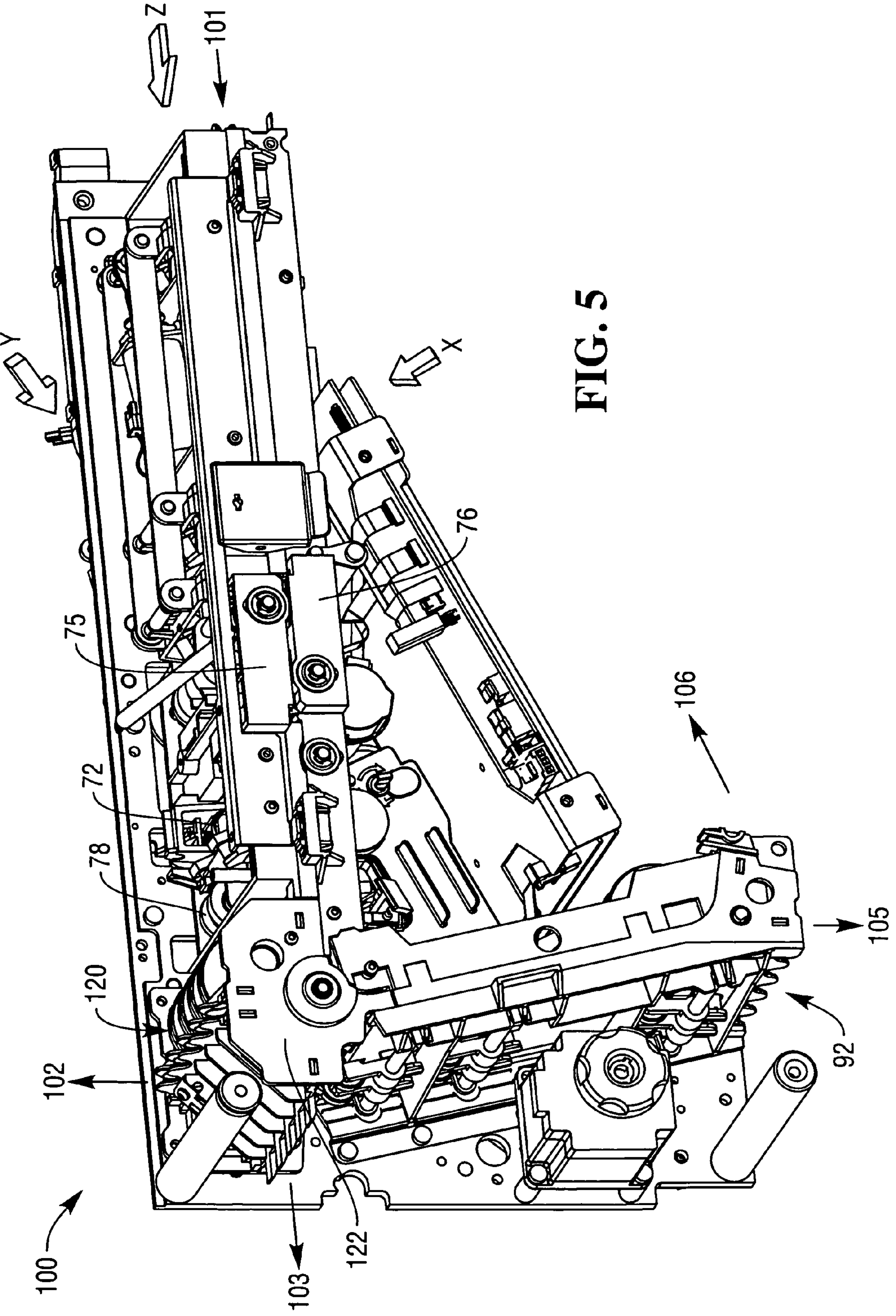
FIG. 5 is a pictorial view of a transport module of the CPM of FIG. 2.

Referring to FIG. 2, a first configuration of a check processing module (CPM) 60 is illustrated. The CPM 60 will now be described with reference to FIGS. 2 and 5. FIG. 2 is a simplified schematic diagram (looking approximately in the direction of arrow A in FIG. 1) of part of the fascia 12 and main parts of the CPM 60. FIG. 5 is a pictorial view of a part (to be described later) used in the CPM 60 shown in FIG. 2.

The CPM 60 of FIG. 2 comprises four main units which include an infeed module 70, a pocket module 80, an escrow re-bunch module (ERBM) 90, and a transport module 100. The infeed module 70 receives a check which has been deposited into the check input/output slot 52 (FIG. 1), and transports the check to an inlet of the transport module 100. The dimensions of the infeed module 70, such as its run length, may vary depending upon the particular model ATM the CPM 60 is installed. The structure and operation of the infeed module 70 are conventional and well known and, therefore, will not be described.

The transport module 100 includes a check input/output transport mechanism which receives a check from the inlet adjacent to the infeed module 70, and transports the check along a first document track portion 101 which is the main track portion. The transport module 100 includes a first document diverter 120 which is operable to divert a check along a second document track portion 102 to the pocket module 80, a third document track portion 103 (not used in the configuration shown in FIG. 2), or a fourth document track portion 104 which leads to the ERBM 90.

The structure and operation of the first diverter 120 shown in FIG. 2 may be any suitable diverter which is capable of diverting a check along one of three different document transport paths. An example of a suitable three-way diverter is disclosed in U.S. patent application Ser. No. 12/004,354, filed on Dec. 20, 2007, entitled "Document Diverter Apparatus for Use in a Check Processing Module of a Self-Service Check Depositing Terminal", and assigned to NCR Corporation located in Dayton, Ohio. The disclosure of U.S. patent application Ser. No. 12/004,354 is hereby incorporated by reference.

A second document diverter 92 is operable to divert a check along a fifth document track portion 105 (not used in the configuration shown in FIG. 2), or a sixth document track portion 106 which leads to the ERBM 90 and then back to the infeed module 70. More specifically, the sixth document track 106 interconnecting the ERBM 90 and the infeed module 70 allows a bunch of checks which has accumulated in the ERBM to be transported back to the infeed module 70. The structure and operation of the second diverter 92 are conventional and well known and, therefore, will not be described.

The transport module 100 further includes a magnetic ink character recognition (MICR) head 72 for reading magnetic details on a code line of a check. The transport module 100 also includes an imager 74 including a front imaging camera 75 and a rear imaging camera 76 for capturing an image of each side of a check (front and rear). An endorser printer 78 is provided for printing endorsements onto checks. An image data memory 94 is provided for storing images of checks. A controller 95 is provided for controlling the operation of the elements within the CPM 60.

The pocket module 80 includes a main storage bin 84 for storing processed checks. The pocket module 80 further includes a reject bin 86 for storing rejected checks. A divert gate 82 is provided for diverting checks to the reject bin 86. If the checks are not diverted to the reject bin 86, they will continue on to the main storage bin 84. The structure and operation of the pocket module 80 are conventional and well known and, therefore, will not be described.

It should be apparent that the CPM 60 of FIG. 2 is shown in a first configuration where a pocket module is located in a top portion of the CPM. Accordingly, components of the CPM 60 of FIG. 2 are configured in a first mode of operation to provide functionality of the Model CPM4 check processing module sold by NCR Corporation.

The CPM 60 may be of a type which processes a bunch of checks or only one check at a time. If a bunch of checks is being processed, each check of the bunch is separated at the infeed module 70 before it is individually processed. Each processed check is then re-assembled at the ERBM 90 to bunch the checks back together. This type of processing is sometimes referred to as "multiple-check processing". Since individual checks are being bunched back together, an escrow module (such as the ERBM 90 shown in FIG. 2) is needed. The ERBM 90 is manufactured and available from Glory Products, located in Himeji, Japan. The ERBM 90 allows a bunch of checks (i.e., more than one check) to be processed in a single transaction. If a bunch of checks has accumulated in the ERBM 90 and is unable to be processed further within the CPM 60, then the bunch of checks is transported via the sixth document track portion 106 back to the infeed module 70 to return the bunch of checks to the ATM customer.

However, if the CPM 60 is of the type which can process only a single check, then the ERBM 90 is not needed. Once a check is received for processing, the check must be deposited into a bin (i.e., either the storage bin 84 or the reject bin 86) before another check can be received for processing. This type of processing is sometimes referred to as "single-check processing".

Figure 3:
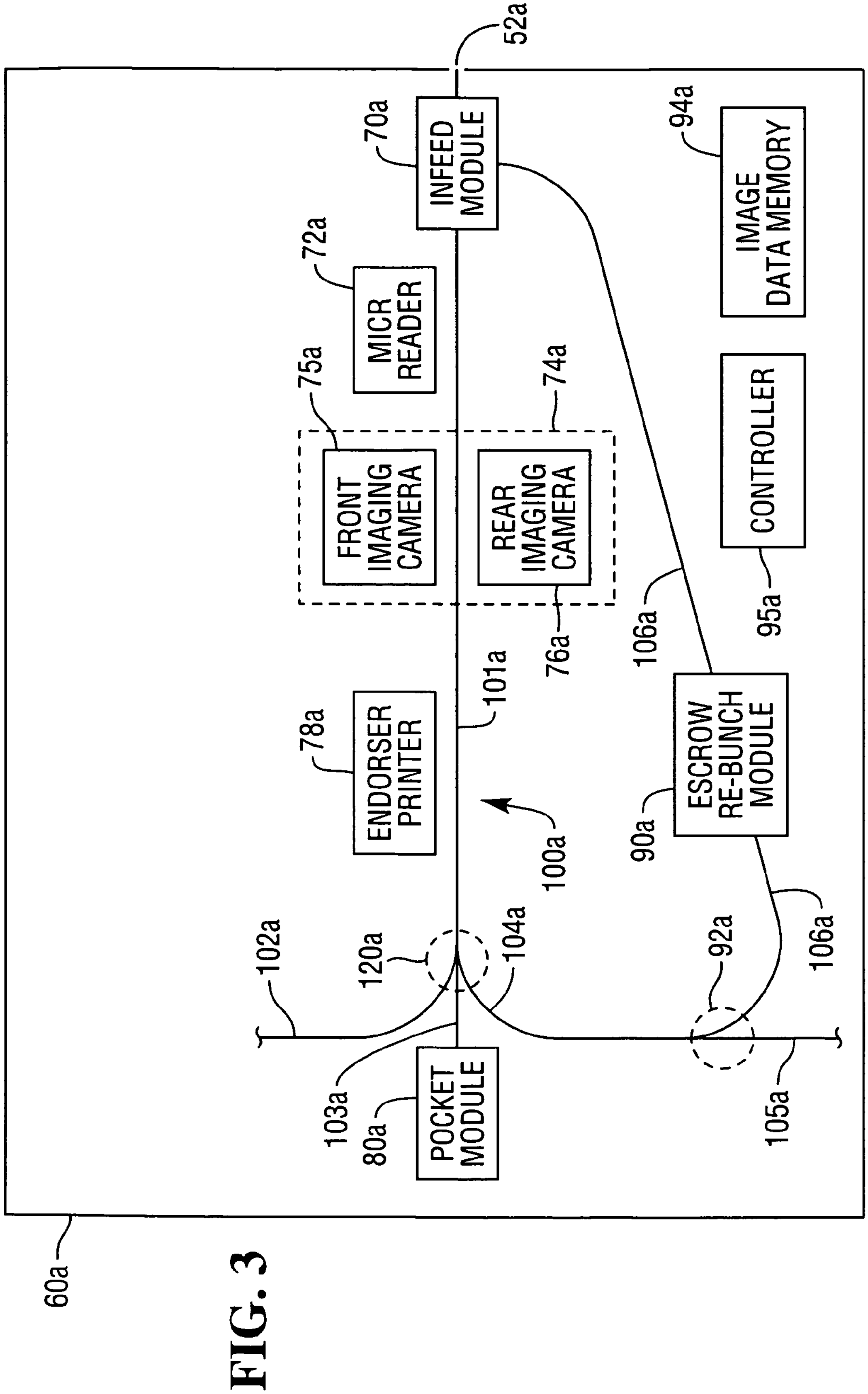
FIG. 3 is diagram similar to the diagram of FIG. 2, and illustrating the CPM configured to operate in another type of ATM.

Referring to FIG. 3, a second configuration of the CPM 60 of FIG. 2 is illustrated. Since the configuration illustrated in FIG. 3 is generally similar to the configuration illustrated in FIG. 2, similar numerals are utilized to designate similar components, the suffix letter "a" being associated with the configuration of FIG. 3 to avoid confusion.

The CPM 60*a* shown in FIG. 3 is in a configuration where the pocket module 80*a* is located in a rear portion of the CPM. Accordingly, components of the CPM 60*a* shown in FIG. 3 are configured in a second mode of operation to provide functionality of the Model CPM2 check processing module sold by NCR Corporation.

The CPM 60*a* shown in FIG. 3 comprises four main units which include the infeed module 70*a*, the pocket module 80*a*, the ERBM 90*a*, and the transport module 100*a*. The infeed module 70*a* receives a check which has been deposited into the check input/output slot 52*a*, and transports the check to an inlet of the transport module 100*a*. The dimensions of the infeed module 70*a*, such as its run length, may vary depending upon the particular model ATM the CPM 60 is installed. The structure and operation of the infeed module 70*a* are conventional and well known and, therefore, will not be described.

The transport module 100*a* includes a check input/output transport mechanism which receives a check from the inlet adjacent to the infeed module 70*a*, and transports the check along the first document track portion 101*a* which is the main track portion. The transport module 100*a* includes the first document diverter 120*a* which is operable to divert a check along the second document track portion 102*a* (not used in the configuration shown in FIG. 3), the third document track portion 103*a* to the pocket module 80*a*, or the fourth document track portion 104*a* which leads to the ERBM 90*a*.

The second document diverter 92*a* is operable to divert a check along the fifth document track portion 105*a* (not used in the configuration shown in FIG. 3), or the sixth document track portion 106*a* which leads to the ERBM 90*a* and then back to the infeed module 70*a*. More specifically, the sixth document track 106*a* interconnecting the ERBM 90*a* and the infeed module 70*a* allows a bunch of checks which has accumulated in the ERBM 90*a* to be transported from the ERBM back to the infeed module 70*a*. The structure and operation of the second diverter 92*a* are conventional and well known and, therefore, will not be described.

The transport module 100*a* further includes a magnetic ink character recognition (MICR) head 72*a* for reading magnetic details on a code line of a check. The transport module 100*a* also includes an imager 74*a* including a front imaging camera 75*a* and a rear imaging camera 76*a* for capturing an image of each side of a check (front and rear). An endorser printer 78*a* is provided for printing endorsements onto checks. An image data memory 94*a* is provided for storing images of checks. A controller 95*a* is provided for controlling the operation of the elements within the CPM 60*a*.

It should be apparent that the CPM 60*a* of FIG. 3 is shown in a second configuration where a pocket module (designated with reference numeral "80*a*" in FIG. 3) is located in a central portion of the CPM. Accordingly, components of the CPM 60*a* of FIG. 3 are configured in a second mode of operation to provide functionality of the Model CPM2 check processing module sold by NCR Corporation.

Figure 4:
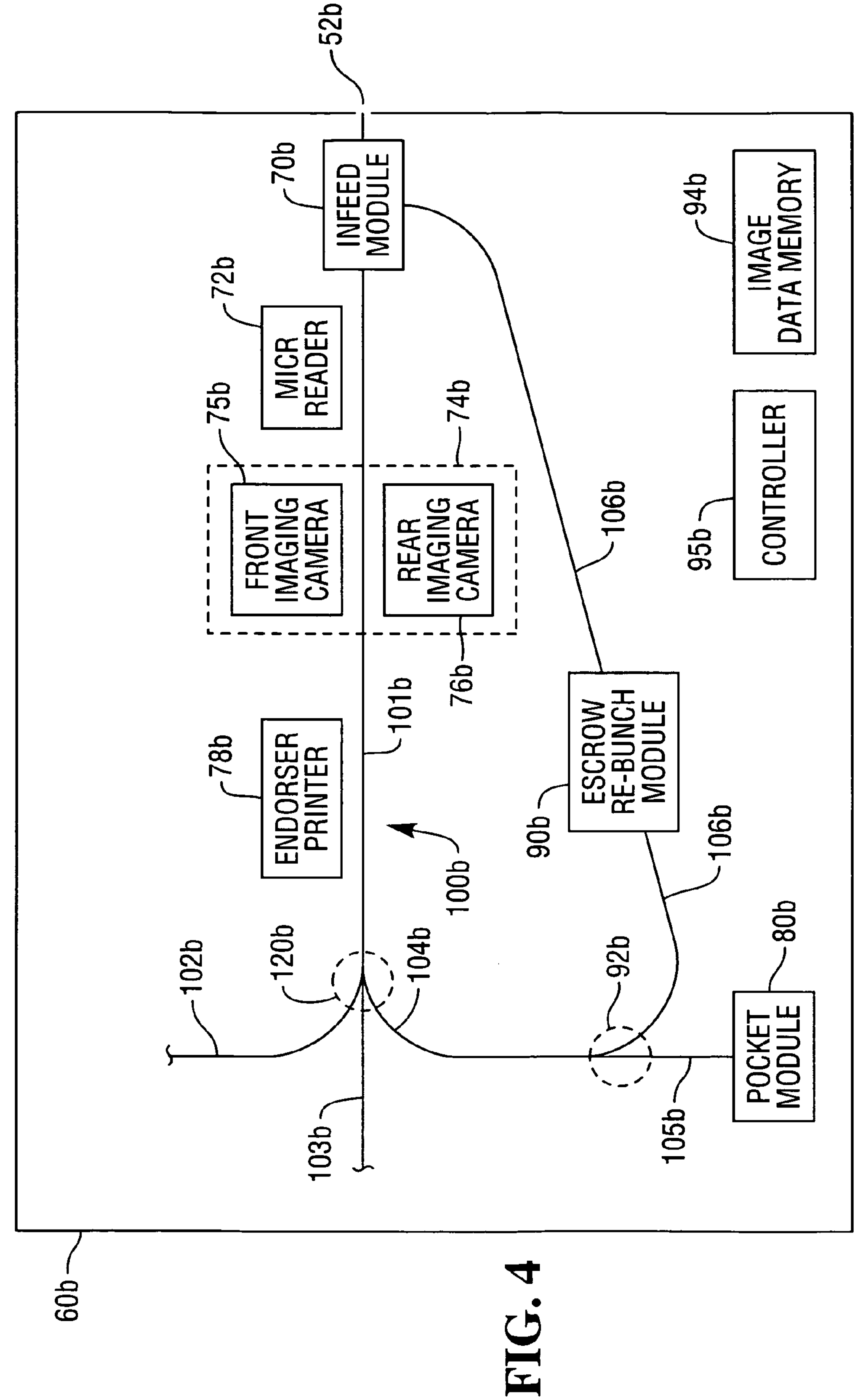
FIG. 4 is diagram similar to the diagrams of FIGS. 2 and 3, and illustrating the CPM configured to operate in yet another type of ATM.

Referring to FIG. 4, a third configuration of the CPM 60 of FIG. 2 is illustrated. Since the configuration illustrated in FIG. 4 is generally similar to the configuration illustrated in FIG. 2, similar numerals are utilized to designate similar components, the suffix letter "b" being associated with the configuration of FIG. 4 to avoid confusion.

The CPM 60*b* shown in FIG. 4 is in a configuration where the pocket module 80*b* is located in a bottom portion of the CPM. Accordingly, components of the CPM 60*b* shown in FIG. 4 are configured in a third mode of operation to provide functionality of the Model CPM3 check processing module sold by NCR Corporation.

The CPM 60*b* shown in FIG. 4 comprises four main units which include the infeed module 70*b*, the pocket module 80*b*, the ERBM 90*b*, and the transport module 100*b*. The infeed module 70*b* receives a check which has been deposited into the check input/output slot 52*b*, and transports the check to an inlet of the transport module 100*b*. The dimensions of the infeed module 70*b*, such as its run length, may vary depending upon the particular model ATM the CPM 60*b* is installed. The structure and operation of the infeed module 70*b* are conventional and well known and, therefore, will not be described.

The transport module 100*b* includes a check input/output transport mechanism which receives a check from the inlet adjacent to the infeed module 70*b*, and transports the check along the first document track portion 101*b* which is the main track portion. The transport module 100*b* includes the first document diverter 120*b* which is operable to divert a check along the second document track portion 102*b* (not used in the configuration shown in FIG. 4), the third document track portion 103*b* (also not used in the configuration shown in FIG. 4), or the fourth document track portion 104*b* which leads to either the pocket module 80*b* or the ERBM 90*b*.

More specifically, the second document diverter 92*b* is operable to divert a check along either the fifth document track portion 105*b* which leads to the pocket module 80*b* or the sixth document track portion 106*b* which leads to the ERBM 90*b* and then back to the infeed module 70*b*. The sixth document track 106*b* interconnecting the ERBM 90*b* and the infeed module 70*b* allows a bunch of checks which has accumulated in the ERBM 90*b* to be transported from the ERBM back to the infeed module 70*b*. The structure and operation of the second diverter 92*b* are conventional and well known and, therefore, will not be described.

The transport module 100*b* further includes a magnetic ink character recognition (MICR) head 72*b* for reading magnetic details on a code line of a check. The transport module 100*b* also includes an imager 74*b* including a front imaging camera 75*b* and a rear imaging camera 76*b* for capturing an image of each side of a check (front and rear). An endorser printer 78*b* is provided for printing endorsements onto checks. An image data memory 94*b* is provided for storing images of checks. A controller 95*b* is provided for controlling the operation of the elements within the CPM 60*b*.

It should be apparent that the CPM 60*b* of FIG. 4 is shown in a third configuration where a pocket module (designated with reference numeral "80*b*" in FIG. 4) is located in a lower or bottom portion of the CPM. Accordingly, components of the CPM 60*b* of FIG. 4 are configured in a third mode of operation to provide functionality of the Model CPM3 check processing module sold by NCR Corporation.

Figure 6:
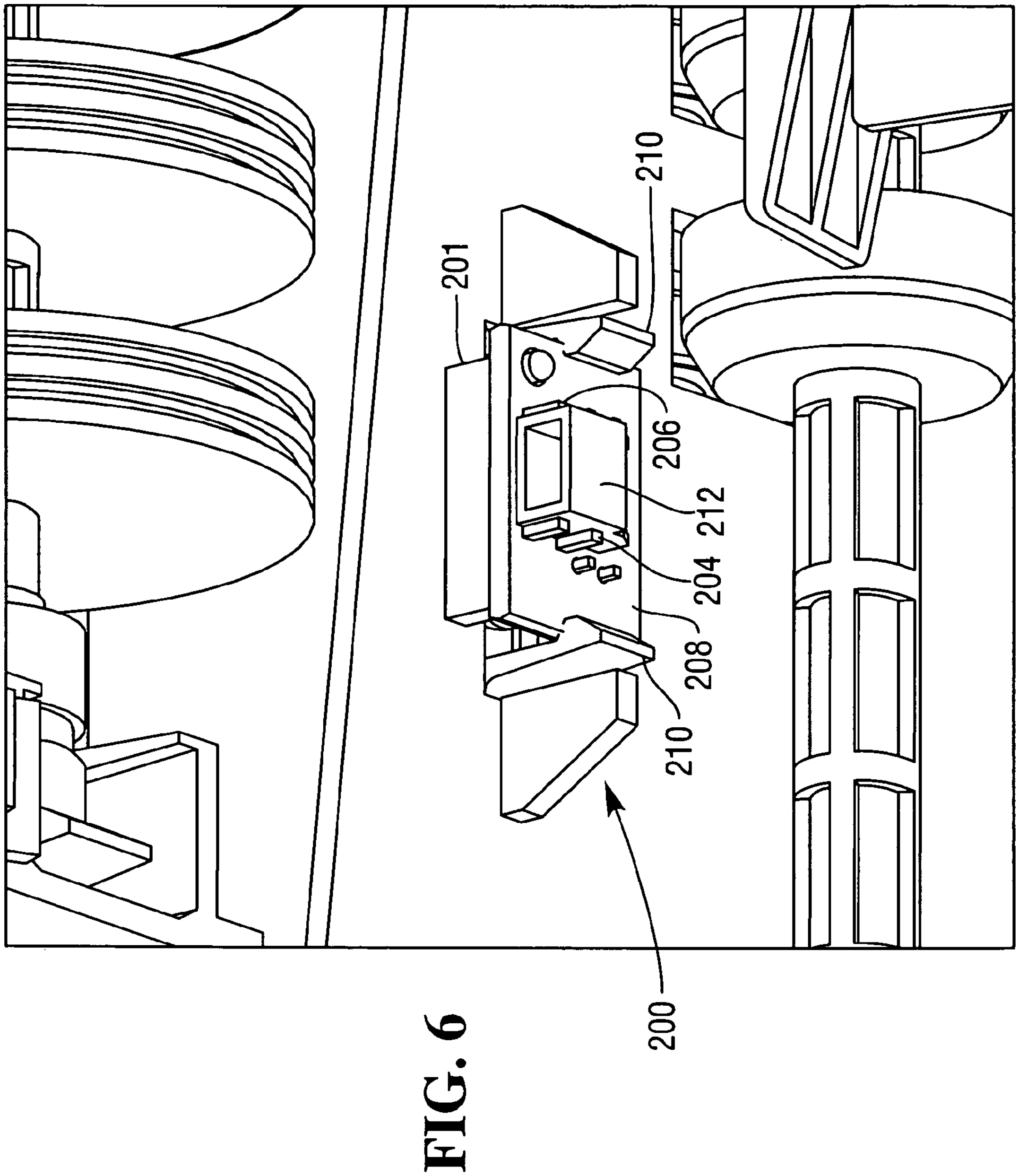
FIG. 6 is a perspective view, looking approximately in the direction of arrow X shown in FIG. 5 with some parts removed, and showing a portion of a prism sensor.
Figure 7:
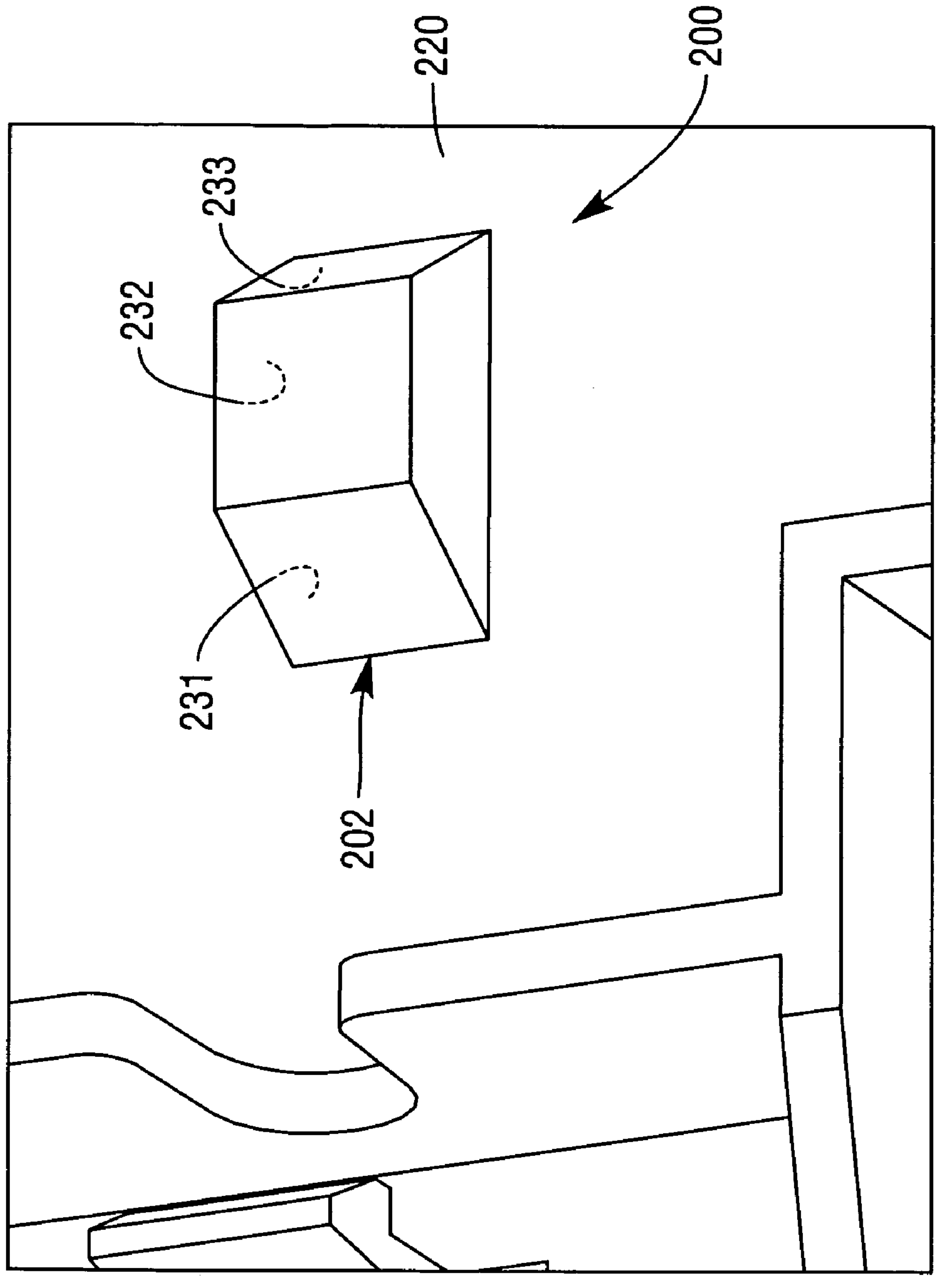
FIG. 7 is an perspective view, looking approximately in the direction of arrow Y shown in FIG. 5, and showing another portion of the prism sensor of FIG. 6.
Figure 8:
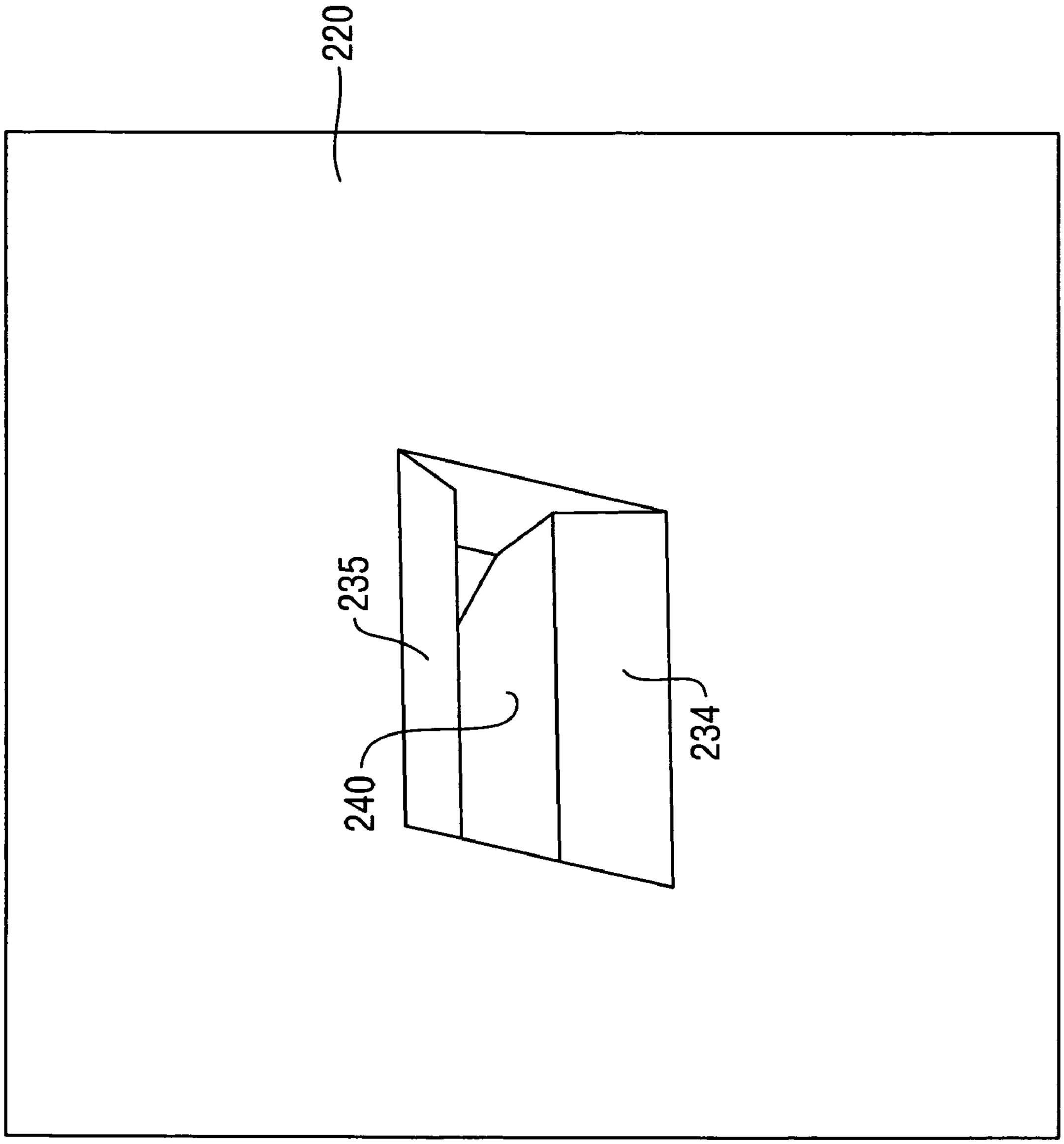
FIG. 8 is a perspective view of the opposite side of the portion of the prism sensor shown in FIG. 7.
Figure 9:
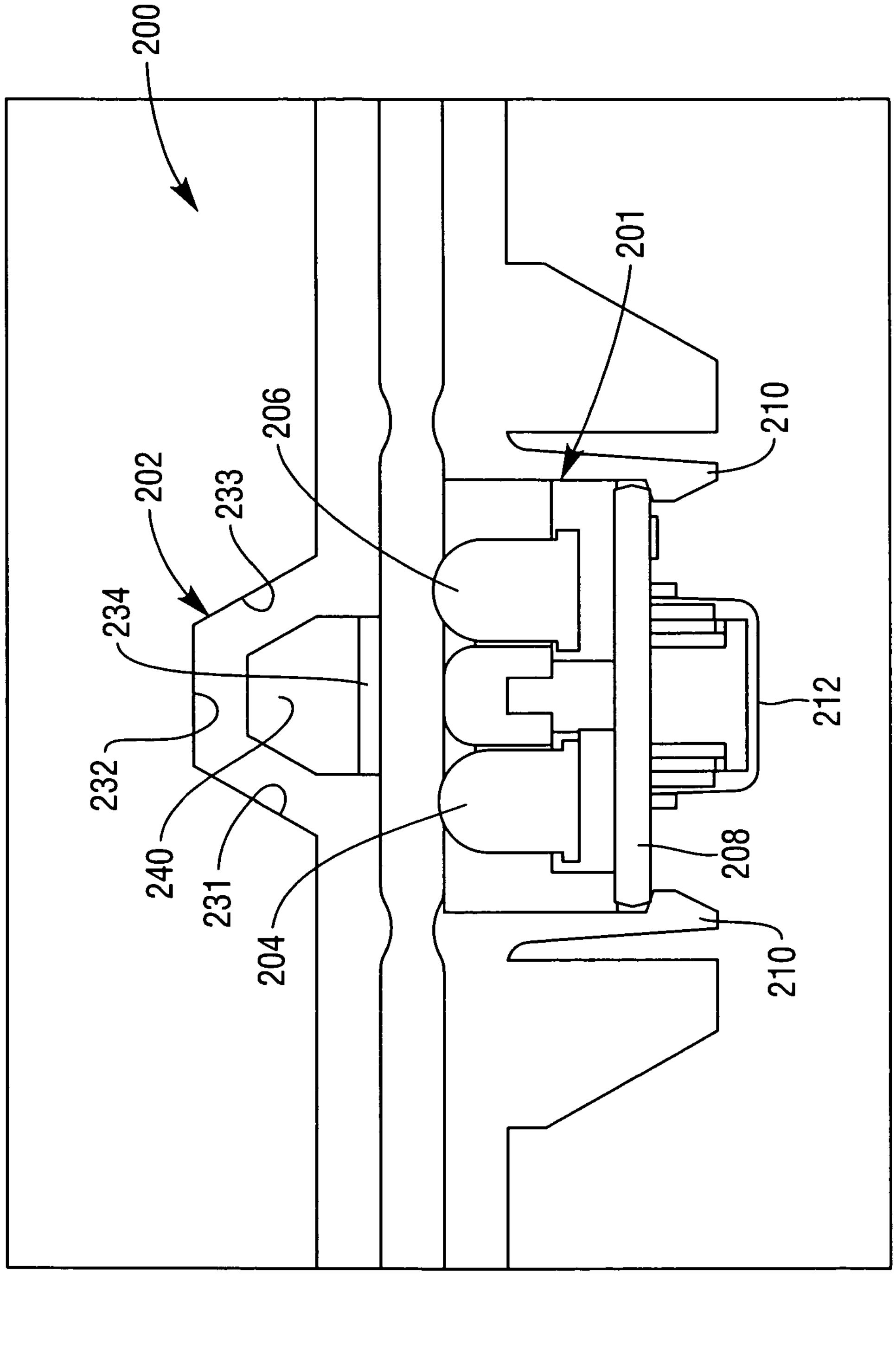
FIG. 9 is a somewhat schematic cross-sectional view, looking approximately in the direction of arrow Z shown in FIG. 5, and showing relationship between the portion of the prism sensor of FIG. 6 and the portion of the prism sensor of FIG. 7.

Referring to FIG. 6, a perspective view, looking approximately in the direction of arrow X shown in FIG. 5 with some parts removed, is illustrated. FIG. 6 shows a first portion 201 of a prism sensor 200 constructed in accordance with one embodiment of the present invention. FIG. 7 is a perspective view, looking approximately in the direction of arrow Y shown in FIG. 5, and showing a second portion 202 of the sensor 200. FIG. 8 shows a perspective view of the opposite side of the second portion 202 of the sensor 200. FIG. 9 is a somewhat schematic cross-sectional view, looking approximately in the direction of arrow Z shown in FIG. 5, and showing relationship between the first and second portions 201, 202 of the sensor 200.

As shown in FIGS. 6 and 9, the first portion 201 of the sensor 200 includes a light emitter 204 and a light receiver 206. The light emitter 204 is preferably in the form of a light emitting diode (LED). The light emitter 204 and the light receiver 206 are mounted on a printed circuit board 208. A pair of snaps 210 (FIG. 6) holds the printed circuit board 208 in place. A connector 212 allows electrical connection to a wiring harness.

As shown in FIGS. 7, 8, and 9, a guide member 220 comprises the second portion 202 of the sensor 200. The second portion 202 is formed in the guide member 220 by molding a cored out area 240 as best shown in the perspective view of FIG. 8. The cored out area 240 shown in FIG. 8 is viewed from the check transport path side of the guide member 220. As shown in FIG. 8, the cored out area 240 is formed in part by a surface 234 and a surface 235. The surfaces 234, 235 are disposed in the cored out area 240 adjacent to the check transport path (e.g., the first document track portion 101 shown in FIG. 2). The surfaces 234, 235 act as ramped surfaces so that checks will not get caught as they are being transported along the check transport path.

The second portion 202 of the sensor 200 is prism-shaped, and has a plurality of reflecting surfaces 231, 232, 233. Each of the reflecting surfaces 231, 232, 233 is substantially flat and has an optical grade finish for maintaining a strong light signal when light is reflected off of the surface. The reflecting surfaces 231, 232, 233 extend relatively wide across the width of the check transport path. This allows for some misalignment of the reflecting surfaces 231, 232, 233 in the horizontal direction.

The second portion 202 may be molded from a clear polycarbonate to form the reflecting surfaces 231, 232, 233 and the ramp surfaces 234, 235. Polycarbonate is a material which is usually sensitive to sink in areas with heavy wall portions. The clear polycarbonate material of the second portion 202 allows an operator to easily see a check or other debris which is caught in check transport path.

Figure 10:
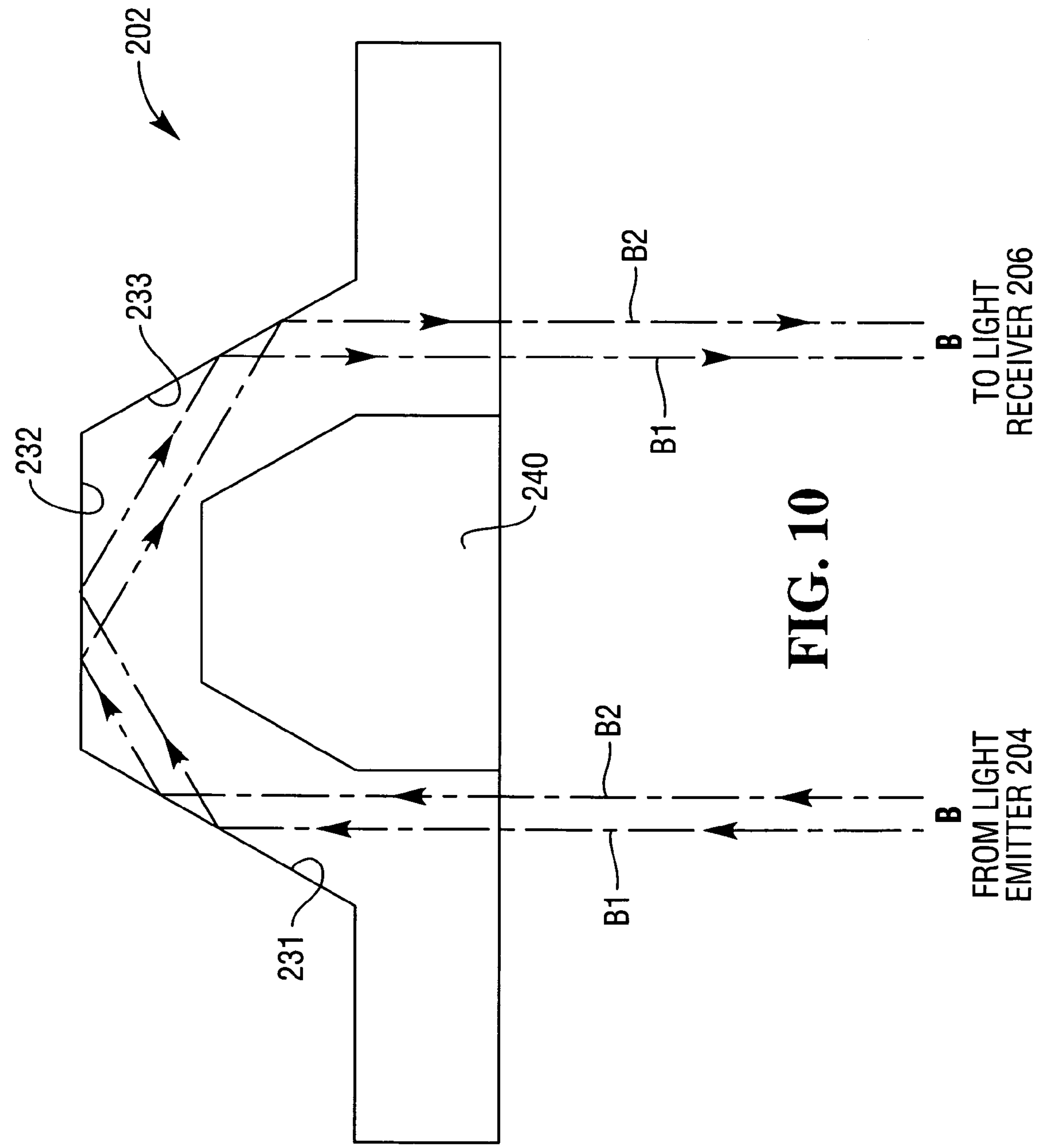
FIG. 10 is a schematic view of the portion of the prism sensor of FIGS. 7 and 8, and showing geometry of light beams.

As shown in FIG. 10, the second reflecting surface 232 is transverse to the each of the first and third reflecting surfaces 231, 233. Light B from the light emitter 204 is emitted towards the reflecting surface 231. Light is reflected off of the reflecting surface 231 towards the reflecting surface 232. Light is then reflected off of the reflecting surface 232 towards the reflecting surface 233. Finally, light is reflected off of the reflecting surface 233 towards the light receiver 206. In this regard, FIG. 10 is a schematic view of the portion of the prism sensor of FIGS. 7 and 8, and showing geometry of light beams B1, B2 of light B from the light emitter 204 to the light receiver 206. The light receiver 206 provides a signal which is indicative of presence or absence of a check in the check transport path.

It should be apparent that light B enters the second portion 202 of the sensor 200 and exits after three reflections. The three reflections ensure that entering and exiting light beams (such as light beam B1 and light beam B2 shown in FIG. 10) stay parallel and equidistant even if the printed circuit board 208 (FIG. 9) of the first portion 201 of the sensor 200 should be misaligned relative to the second portion 202 of the sensor. Such would not be true for light beams of two reflections. Also, it should be apparent that the cored out area 240 (FIG. 9) of the second portion 202 of the sensor 200 allows constant wall thickness to be maintained while avoiding interference with the light path.

Although the above description describes the PERSONAS (trademark) 6676 NCR ATM embodying the present invention, it is conceivable that other models of ATMs, other types of ATMs, or other types of self-service check depositing terminals may embody the present invention. Self-service depositing terminals are generally public-access devices that are designed to allow a user to conduct a check deposit transaction in an unassisted manner and/or in an unattended environment. Self-service check depositing terminals typically include some form of tamper resistance so that they are inherently resilient.

Further, although the above description describes the CPM 60, 60*a*, 60*b* which has the ERBM 90, 90*a*, 90*b*, it is conceivable that the present invention may be embodied in a CPM which does not have an ERBM.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A prism sensor for detecting presence or absence of a document in a document transport path, the prism sensor comprising:

a light emitter disposed on a first side of the document transport path and for emitting light across the document transport path to a second side of the document transport path;

a reflector including (i) a first reflecting surface for receiving light from the light emitter and for providing first reflected light in response thereto, (ii) a second reflecting surface for receiving the first reflected light from the first reflecting surface and for providing second reflected light in response thereto, and (iii) a third reflecting surface for receiving the second reflected light from the second reflecting surface and for providing third reflected light in response thereto; and a light receiver for receiving the third reflected light from the third reflecting surface and for providing a signal which is indicative of presence or absence of a document in the document transport path.

2. A prism sensor according to claim 1, wherein the each of the first, second, and third reflecting surfaces comprises a substantially flat surface.

3. A prism sensor according to claim 2, wherein the second reflecting surface is transverse to each of the first and third reflecting surfaces.

4. A prism sensor according to claim 3, wherein the reflector comprises a clear polycarbonate material which has a cored out portion and which has been molded to form the first, second, and third reflecting surfaces in the cored out portion.

5. A prism sensor according to claim 4, further comprising a pair of ramp surfaces which are formed in the cored out portion adjacent to the document transport path and which are disposed between the first, second, and third reflecting surfaces and the document transport path.

6. A check processing module (CPM) for a self-service check depositing terminal, the CPM comprising:

a check transport path;

a light emitter disposed on a first side of the check transport path and for emitting light across the check transport path to a second side of the check transport path;

a reflector including (i) a first reflecting surface for receiving light from the light emitter and providing first reflected light in response thereto, (ii) a second reflecting surface for receiving the first reflected light from the first reflecting surface and providing second reflected light in response thereto, and (iii) a third reflecting surface for receiving the second reflected light from the second reflecting surface and providing third reflected light in response thereto; and a light receiver for receiving the third reflected light from the third reflecting surface and providing a signal which is indicative of presence or absence of a check in the check transport path.

7. A CPM according to claim 6, wherein the each of the first, second, and third reflecting surfaces comprises a substantially flat surface.

8. A CPM according to claim 7, wherein the second reflecting surface is transverse to each of the first and third reflecting surfaces.

9. A CPM according to claim 8, wherein the reflector comprises a clear polycarbonate material which has a cored out portion and which has been molded to form the first, second, and third reflecting surfaces in the cored out portion.

10. A CPM according to claim 9, further comprising a pair of ramp surfaces which are formed in the cored out portion adjacent to the document transport path and which are disposed between the first, second, and third reflecting surfaces and the document transport path.

11. A method of operating a prism sensor for a check processing module (CPM) for a self-service check depositing terminal, the method comprising:

emitting light in a first direction across a check transport path;

receiving light from the light emitter and providing first reflected light in response to receiving light from the light emitter;

receiving first reflected light and providing second reflected light in response to receiving the first reflected light;

receiving second reflected light and providing third reflected light in response to receiving the second reflected light; and receiving third reflected light and providing a signal which is indicative of presence or absence of a check in the check transport path.

12. A method according to claim 11, wherein the third reflected light is directed across the check transport path in a second direction which is opposite the first direction.

* * * * *